(12) United States Patent
Suga et al.

(10) Patent No.: US 8,107,088 B2
(45) Date of Patent: Jan. 31, 2012

(54) DISPLACEMENT SENSOR

(75) Inventors: Takahiro Suga, Fukuchiyama (JP); Hiroaki Takimasa, Ayabe (JP)

(73) Assignee: Omron Corporation, Kyoto (JP)

( * ) Notice: Subject to any disclaimer, the term of this patent is extended or adjusted under 35 U.S.C. 154(b) by 246 days.

(21) Appl. No.: 12/646,577

(22) Filed: Dec. 23, 2009

(65) Prior Publication Data

US 2010/0171955 A1 Jul. 8, 2010

(30) Foreign Application Priority Data

Dec. 26, 2008 (JP) ................ P2008-332707

(51) Int. Cl.
*G01B 11/14* (2006.01)
(52) U.S. Cl. .................................. 356/614
(58) Field of Classification Search ........... 356/614–624
See application file for complete search history.

(56) References Cited

FOREIGN PATENT DOCUMENTS

| JP | 09-026545 A | 1/1997 |
|---|---|---|
| JP | 2002-213914 A | 7/2002 |
| JP | 2007-121122 A | 5/2007 |

*Primary Examiner* — Tarifur Chowdhury
*Assistant Examiner* — Tara S Pajoohi
(74) *Attorney, Agent, or Firm* — Foley & Lardner LLP

(57) ABSTRACT

This invention provides a displacement measurement device, a displacement measurement method, and a thickness measurement device capable of easily ensuring a conjugate relationship between the light source and the diaphragm and capable of accurately measuring the change in distance with the testing target. In the displacement measurement device, the light from the laser diode is collected towards the pin hole of the diaphragm plate at the collective lens, and then sent to the objective lens through the pin hole. The light is reflected at a surface of work, and detected by a photodiode through the objective lens, the pin hole, the collective lens, and the half mirror. That is, the pin hole becomes a substantial light source, and becomes a diaphragm with respect to the incident light on the work. The spot diameter collected on the pin hole by the collective lens is greater than the diameter of the pin hole. The light receiving quantity signal of the return light component on a diaphragm plate, shown with an outlined arrow, is removed by a high-pass filter.

10 Claims, 12 Drawing Sheets

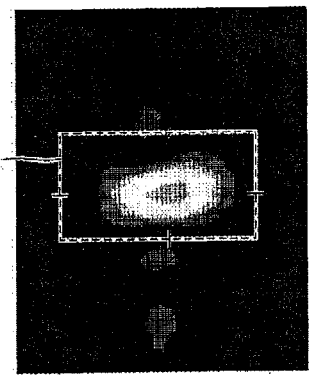
FIG. 3A
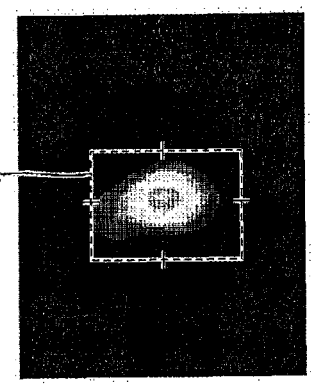
FIG. 3B
FIG. 3C
FIG. 3D
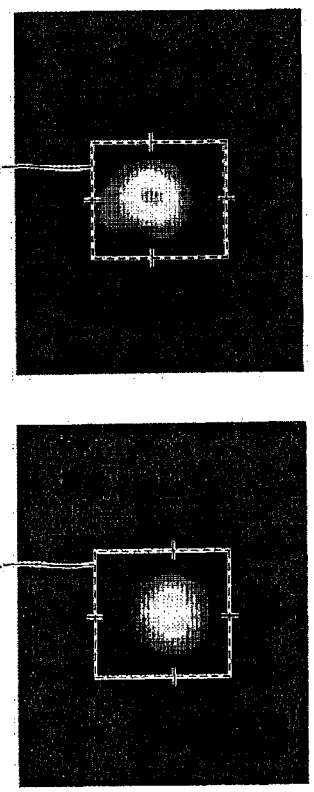
FIG. 3E
RELATIONSHIP OF PIN HOLE DIAMETER AND SPOT DIAMETER ON WORK
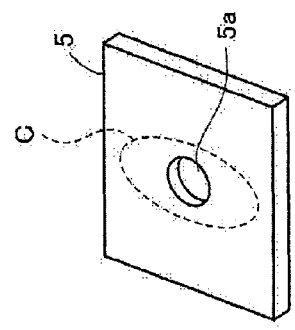
FIG. 3F

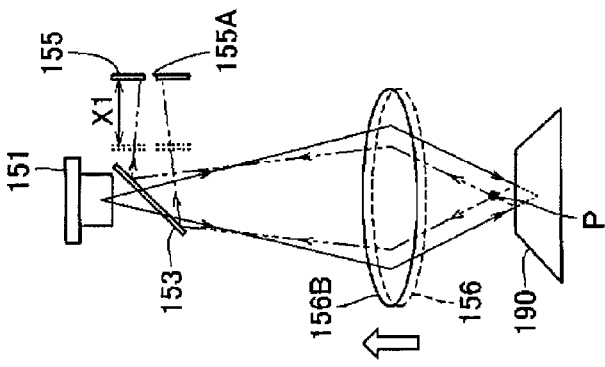
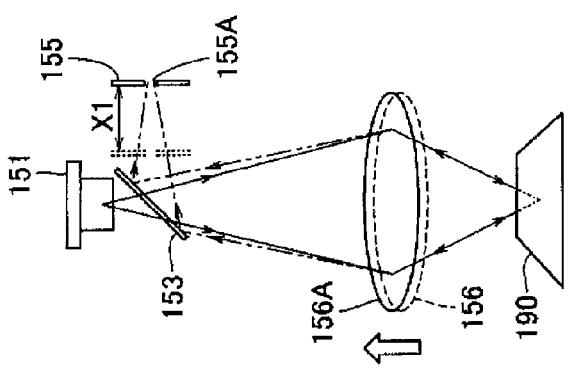
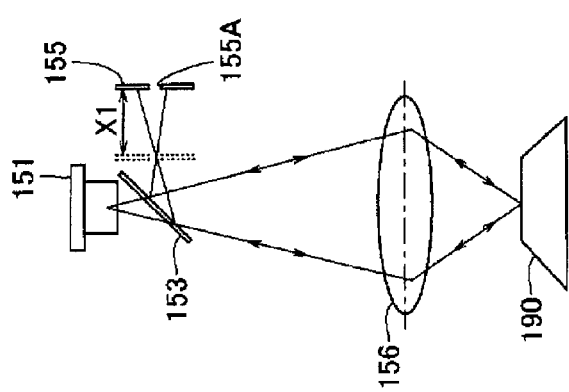
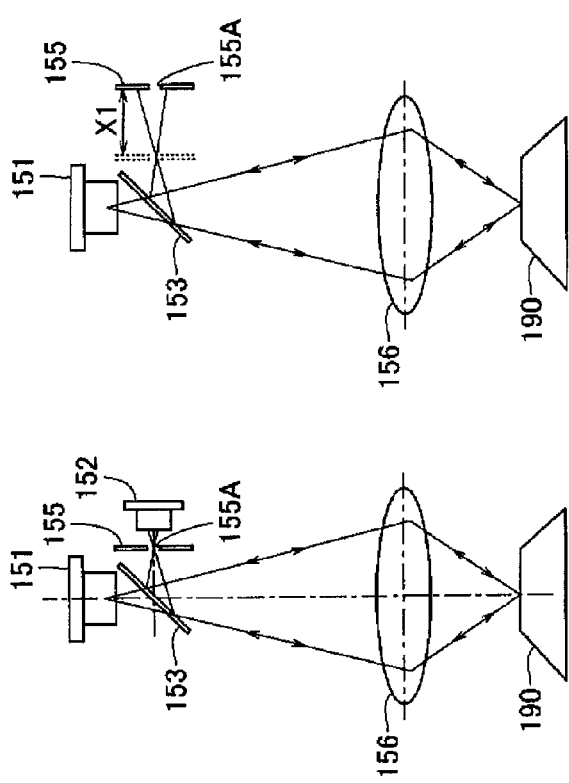

DISPLACEMENT SENSOR

BACKGROUND OF THE INVENTION

This application is based on Japanese Patent Application No. 2008-332707 filed with the Japan Patent Office on Dec. 26, 2008, the entire content of which is hereby incorporated by reference.

TECHNICAL FIELD

The present invention relates to a displacement sensor using a confocal optical system for measuring displacement of a measuring target object in a non-contacting manner.

RELATED ART

Conventionally, the displacement sensor uses a confocal optical system, where a converging position of light applied towards a measuring target object is changed by sweeping the lens in an optical axis direction, and an displacement amount is measured based on a fact that a size of a spot on light receiving opening of received reflected light becomes a minimum when the converging position coincides with a surface of the measuring object, as disclosed in Japanese Unexamined Patent Publication No. 2007-121122. In Japanese Unexamined Patent Publication No. 2007-121122, an objective lens is fixed and other lenses are swept to change the converging position, but the operation will be described with a configuration of sweeping the objective lens in FIGS. 11A to 11D for the sake of facilitating the understanding.

First, with reference to FIG. 11A, light applied from a laser diode 151 converges towards a measuring object 190 by an objective lens 156 in the displacement sensor. Reflected light reflected at a surface of the measuring object 190 passes through the objective lens 156, a half mirror 153, and a pin hole 155A of a light shielding plate 155, and is received by a photodiode 152. The pin hole 155A is arranged in a positional relationship of becoming a mirror image with a light emitting point of the laser diode 151 with respect to a reflection surface of the half mirror 153. When a converging position of the light converged by the objective lens 156 and the surface of the measuring object 190 coincide, the reflected light converges on the light shielding plate 155 and a light quantity that passes through the pin hole 155A becomes a maximum, and hence a light receiving quantity received by the photodiode 152 takes a maximum value as a result.

When the converging position and the surface of the measuring object 190 are shifted with respect to the optical axis direction of the light converged by the objective lens 156, the applied light does not converge on the surface of the measuring object 190, and the light reflected at the surface of the measuring object 190 reaches the light shielding plate 155 through the half mirror 153 in a spread state. The light quantity that passes through the pin hole 155A thus decreases, and the light receiving quantity at the photodiode 152 decreases.

In the displacement sensor, the light is applied from the laser diode 151, and the light receiving quantity by the reflected light is detected at the photodiode 152 while sweeping the converging position of the light applied towards the measuring object 190 in the optical axis direction by sweeping the objective lens 156 in the optical axis direction.

A maximum light receiving quantity is thus obtained when the applied light converges on the surface of the measuring object 190, so that a position of the surface of the measuring object 190 corresponded beforehand with a position of the objective lens 156 is obtained by measuring the position of the objective lens 156 in such state.

Japanese Unexamined Patent Publication No. 09-26545 discloses a fluorescent confocal optical scanner, in which a plurality of pin holes is formed in a Nipkow disk, for scanning a converging beam on the measuring object by rotating with a collective lens combined with each pin hole of the Nipkow disk. In such scanner, as shown in FIG. 12, the light from a light source passes through a plurality of micro-lenses assembled to a micro-lens disc 102, transmits through a dichroic mirror 105, and a plurality of spot lights are applied onto a test target 109 such as work through a plurality of pin holes formed in the Nipkow disk 103 (a plurality of micro-lenses and pin holes are not illustrated). Fluorescence is generated at a converging point on the measuring object 109, where fluorescence having a wavelength different from the applied spot light passes through the pin hole formed in the Nipkow disk 103, and is reflected by the dichroic mirror 105 and separated from an optical path of irradiation light so as to be guided to a camera 106. In other words, the characteristics of the dichroic mirror 105 are selected such that the wavelength of the light of the light source transmits through the dichroic mirror 105, and the wavelength of the fluorescence is reflected by the dichroic mirror 105. A plurality of spot lights on the test object 109 is scanned when the micro-lens disc 102 and the Nipkow disk 103 integrally rotate, so that a focused image (image in which only the focused portion is extracted) by the fluorescence can be obtained with the camera 106. In such device, information on the shape of the measuring object 109 can be acquired by acquiring the focused image at each height while relatively changing a distance between the measuring object 109 and the Nipkow disk 103 since the converging position of the irradiation light is not swept and is fixed.

Japanese Unexamined Patent Publication No. 2002-213914 describes a confocal displacement measurement device, in which a pin hole is provided, light from a light source is entered to a pin hole, and the passed light is converged towards the measuring object and the reflected light thereof is converged towards the pin hole to receive the passed light, for the purpose of accurate position measurement of a semiconductor wafer and the like. On the measuring object side, the irradiation light and the reflected light are coaxial, and the light applied from the light source towards the pin hole and the light passed through the pin hole and entered to a light receiving unit are separated by a beam splitter. A piezoelectric driver is driven to move the entire confocal displacement measurement device such that a detected signal light always becomes a maximum, and the displacement thereof is measured.

SUMMARY

In the displacement sensor described with reference to FIGS. 11A to 11D, a light receiving quantity of the light passed through the pin hole 155A and received by the photodiode 152 is detected, and then a position in the optical axis direction of the objective lens 156 when the light receiving quantity becomes a maximum value is detected. The position is detected assuming that the surface of the measuring object 190 exists at the converging position of the light applied towards the measuring object that uniquely corresponds to a position of the objective lens 156.

In such displacement sensor, it is important that the light emitting point of the laser diode 151, which is the light source, and the pin hole 155A are in a positional relationship of being optically mirror images. For instance, as shown in FIG. 11B, if a position of the pin hole 155A shifts by a distance X1 from a state shown in FIG. 11A, the reflected light does not converge on the light shielding plate 155 even if the converging position of the light applied towards the measuring object 190 is coincided with the surface of the measuring object 190, and the spot will be in a spread state. In this case, the position of the objective lens 156 at where the light receiving quantity becomes a maximum is shifted from the position of the objective lens 156 at where the converging position coincides with the surface of the measuring object 190.

Further, in such a case, the reflecting mode of light at the surface of the measuring object 190 is also influenced by surface roughness of the surface of the measuring object 190.

In FIG. 11C, the position 156A of the objective lens at where the light receiving quantity becomes a maximum when the surface of the measuring object 190 is a diffusing surface (surface where the reflected light becomes a diffuse reflected light) with the position of the pin hole 155A shifted by the distance X1 from the state shown in FIG. 11A is shown. The reflected light is shown with a chain double-dashed line in the figure. If a surface of the measuring object 90 is a diffusing surface, the light reflected by the surface of the measuring object 190 acts as if light applied with the entire spot generated on the relevant surface as the diffused light source. If the objective lens is at a position of coinciding the converging position of the irradiation light with the surface of the measuring target object 190, the spot of the reflected light blurs and spreads on the light shielding plate 155 as described in FIG. 11B, and thus a maximum light receiving quantity is not obtained. If the objective lens is at a position the spot of the reflected light at the surface of the measuring target object 190 is exactly image-formed on the light shielding plate 155, the blur of the image of the spot formed on the light shielding plate 155 is suppressed to a minimum and the light receiving quantity becomes large. Therefore, the position of the objective lens at where the light receiving quantity becomes a maximum approaches the laser diode 151 side than the position of converging the light on the surface of the measuring object 190 and exits until the position (position of 156A in FIG. 11C) of image-forming the reflected light of the surface of the measuring object 190 on the light shielding plate 155. The position of the objective lens at where the light receiving quantity becomes a maximum is influenced by the blurring degree of the spot on the light shielding plate 155, and thus differs by the numerical aperture of the optical system and differs by the diffuse reflection property of the measuring object 190. In other words, the light receiving quantity received after passing through the pin hole 155A without the surface of the measuring object 190 and the converging point of light coinciding becomes a maximum, and the surface of the measuring object 190 is falsely measured as existing at a position (lower side in FIG. 11C) different from the position measured when the pin hole 155A and the light emitting point of the laser diode 151 are in a positional relationship of being optically mirror images.

In FIG. 11D, a position 156B of the objective lens at where the light receiving quantity becomes a maximum when the surface of the measuring object 190 is a mirror surface with the position of the pin hole 155A shifted by the distance X1 from the state shown in FIG. 11A is shown. If the surface of the measuring object 190 is a mirror surface, the light reflected by the surface of the measuring object 190 converges after being reflected at the surface of the measuring object 190 and acts as if light applied with such converging point as the light source if the light applied from the objective lens is applied so as to converge towards a position more distant than the surface of the measuring object 190. On the contrary, the mirror image with respect to the surface of the measuring object 190 of the converging point becomes a virtual light source of the reflected light, and acts as if light applied from the light source of the mirror image if the light applied from the objective lens is converged before reaching the surface of the measuring object 190. If shifted so that the optical path length is longer by the distance X1 with respect to the position at where the position of the pin hole 155A becomes the mirror image of the light emitting point of the laser diode 151, as in FIG. 11D, the light receiving quantity becomes a maximum when the objective lens 159B is at a position where the converging point P of the light converged after being mirror surface reflected by the measuring object 190 image-forms on the light shielding plate 155. In this case, the surface of the measuring object 190 exists at substantially the middle of the position where the light applied from the objective lens converges when the measuring object does not exist and the position in an image-forming relationship with respect to the position shifted pin hole 155A. In other words, in such case as well, the surface of the measuring object 190 is falsely measured as existing at a position (lower side in FIG. 11D) different from the position measured when the light emitting point of the laser diode 151 and the pin hole 155A are in a positional relationship of being optically mirror images. The position of the objective lens, at where the light receiving quantity in a case where the measuring object is a mirror surface becomes a maximum, is not influenced by the numerical aperture of the optical system, and thus does not necessarily coincide with a case where the measuring target object 190 is a diffusing surface.

Therefore, if the light source (light emitting point of laser diode 151 in FIGS. 11A to 11D) and the light receiving opening (pin hole 155A of FIGS. 11A to 11D are position shifted and are not in a positional relationship of being mirror images, the position of the measuring object at where the light receiving quantity becomes a maximum differs by the difference in surface roughness of the surface of the measuring object (surface of measuring object 190), and displacement measurement error occurs.

The diffusing surface and the mirror surface generally exist at the surface of the measuring object 190 to be tested, and both components of the diffuse reflection component and the mirror surface reflection component coexist in most cases. Furthermore, the ratio thereof also tends to differ depending on the locations on the surface of the measuring object 190. That is, it is difficult to measure the displacement of the surface of the measuring object 190 assuming that the surface of the measuring object 190 is only the diffusing surface or only the mirror surface, and it is difficult to measure assuming that the ratio is uniform when the components coexist.

Therefore, it is important to arrange the light source and the light receiving opening in a positional relationship of being mirror images in the displacement sensor to accurately measure the measuring object in which the surface state is not constant.

However, if an irradiation light is assumed as a microscopic converging spot (micron order) to enhance the measurement accuracy, and a size of the light receiving opening is made to a size equal thereto, an accuracy of submicron order is required to arrange the light source and the light receiving opening in a positional relationship of accurately being mirror images, and the adjustment task becomes difficult and complicating. Furthermore, positional shift may occur due to temperature change even if adjustment is made. In order to avoid such complication, a distance between the lens and the light source and a distance between the lens and the light receiving opening are made long, and a deflection angle of an optical axis that occurs from the positional shift amount is made small, but this leads to a problem in that the device enlarges.

In the confocal optical scanner optical system shown in FIG. 12 as in Japanese Unexamined Patent Publication No. 09-26545, the pin hole in the Nipkow disk 103 is used as both the light source and the light receiving opening, and the problem of positional shift of the light source and the light receiving opening does not occur. Such confocal optical scanner is used in a fluorescence microscope, where only a very weak fluorescence from the object is separated from the return light of the irradiation light by the dichroic mirror and is detected without being buried in the background light by using a fact that the wavelength of the fluorescence emitted by the object is different from the wavelength of the irradiation light. However, in the displacement sensor, displacement measurement of various measuring objects is normally desired, and the measuring object may not necessarily generate fluorescence having a wavelength different from the applied light. Therefore, cases in which the configuration of using the dichroic mirror can be applied are rare. In other words, a problem in that the displacement measurement of various measuring objects cannot be responded arises.

In Japanese Unexamined Patent Publication No. 2002-213914, a problem of positional shift of the light source and the light receiving opening does not arise since the pin hole is once interposed. However, in such configuration, a background light exists as the return light generated when the applied light is rejected by the pin hole enters the light receiving unit. If the measuring object is a low reflectivity object, the reflected light quantity obtained from the measuring object is very small, and thus is buried in the return light of the background and cannot be detected with satisfactory accuracy.

The present invention has been devised to solve the problems described above, and an object thereof is to provide a displacement sensor capable of accurately measuring the displacement with respect to the measuring object having various surface states and reflectivity.

A displacement sensor according to the present invention includes: a light projecting unit for applying light by an intensity signal having a specific frequency component; an open portion including a light shielding member configuring an opening, the light shielding member shielding at least one portion of the light applied from the light projecting unit, the opening passing other portions of the light applied from the light projecting unit, and the open portion having the light passed through the opening as a new diverging light by cutting out the applied light; a sweep converging unit for converging and applying the diverging light passed through the opening towards a measuring object, and continuously changing a converging position of the light by a predetermined mode along an optical axis direction of the converging light, and guiding a reflected light of the light applied onto the measuring object to the open portion by advancing the reflected light in an opposite direction with respect to an optical path of the diverging light; an optical path separating element for separating the optical path of the reflected light passed through the opening from the optical path of the irradiation light from the light projecting unit to the opening; a light receiving unit for receiving the reflected light separated from the optical path of the irradiation light by the optical path separating element, and outputting a light receiving signal corresponding to an incident light quantity; a filter unit for obtaining a filter processed signal by removing the signal of the specific frequency component from the light receiving signal; and a processing unit for acquiring information on a distance to the measuring object based on the filter processed signal; wherein the open portion changes a proportion of the reflected light passing through the opening when the converging position of the reflected light from the measuring object changes by operation of the sweep converging unit; the specific frequency component of the signal intensity of the light applied by the light projecting unit is a frequency component different from a frequency component of the light receiving signal, which changes by the operation of the sweep converging unit, or a frequency component of one portion of the frequency component of the light receiving signal; and the processing unit acquires the information on the distance to the measuring object based on change of the filter processed signal, which occurs by the operation of the sweep converging unit.

The frequency component herein does not mean the frequency component corresponding to the wavelength of the light, but means the frequency component obtained when the signal represented in the time region is represented with the corresponding frequency region.

"Applying light by an intensity signal having a specific frequency component" refers to a signal in which the intensity of the light to be applied is a finite and defined one or a plurality of frequency components (include frequency band including continuous frequencies). Therefore, a case in which the frequency component is indefinite since the intensity signal of the light to be applied is random or a case in which the intensity signal is finite but is substantially spread over the entire frequency band, for example, when spread over the entire frequency band of the signal that can be handled in the processing unit are excluded.

The light applied by the light projecting unit includes Gauss beam, parallel light, light exit from the diverging light source, light in which such lights are converged by a lens and given direction component over a constant angular range, and light in which light is exit from any position towards the opening by a large light source that emits a diffusion light.

The opening is a region in a space for passing the light, and includes a pin hole and a slit. "Configuring an opening" means limiting a region in the space for passing the light by arranging a light shielding member.

The light that passed through the opening does not become a new diverging light if the light applied onto the open portion is not rejected at all by the opening, that is, if all lights applied towards the open portion pass through the opening.

The new diverging light may be converged and applied from the light projecting unit towards the open portion and some of the irradiation light may be cut out by the opening on the open portion, or may be applied from a light source spread over a constant range in the space towards the open portion so that the light passed through the opening is spread (e.g., when using large light emitting body). If the light that passed through the opening spreads by diffraction as the opening is narrow, the light applied from the light projecting unit may be applied to the open portion as a parallel light.

The diverging light may be a coherent light or may be an incoherent light. The coherent light includes Gauss beam and beam that can be approximated thereto.

The convergence or divergence of light merely needs to be convergence or divergence with respect to the component in a specific direction at least orthogonal to the optical axis of the light. A case in which light is converged or diverged center symmetric with respect to the optical axis is also included. If the opening is a slit, the component in the specific direction is in a direction perpendicular to the longitudinal direction of the slit.

The expression of "a predetermined mode" in the description of "the sweep converging unit continuously changes a converging position of the light by a predetermined mode" means not that the manner of change in the converging position is indefinite but that the converging position changes according to a changing mode defined in advance, and includes a case in which the converging position changes at predetermined different speed for every converging position in addition to a case in which the converging position changes at a constant speed. A case in which the converging position of light changes at a predetermined speed for every position as a result of the optical component for converging light moving at a constant speed or a constant oscillation cycle is also included. The changes includes change in one direction or change in a reciprocating manner in a predetermined range, and may be a case of singly changing or case of repeatedly changing periodically.

The sweep converging unit may be configured by an optical component group such as a plurality of lenses and mirrors, which may be entirely or partially moved, or may be configured by a single moving lens or mirror.

The optical path separating element includes a half mirror and a polarization beam splitter. The description of "Removing the signal of the specific frequency component from the light receiving signal" includes a case of removing all signals having the specific signal frequency component and a case of removing at least some of the signal frequency component.

The filter processing includes a frequency filter such as a high-pass filter, a low-pass filter and a band-pass filter, but may be filter processing of performing a specific calculation on the signal in a time region. In other words, the process may be any process that serves as filter processing for removing at least some or all of the specific signal frequency components equivalently. The filter processing may remove the signal having a signal frequency component of the intensity signal of the applied light and selectively pass the signal frequency component contained in the change of the light receiving output of the light receiving unit that occurs by the operation of the sweep converging unit.

According to the present invention, high sensitivity displacement measurement can be performed while preventing occurrence of displacement measurement error due to surface roughness of the measuring object since the light source and the light receiving opening coincide and the reflected light from the measuring object can be extracted with the influence of the return light reduced.

Preferably, the light projecting unit applies light from a laser diode so that a spot formed on the open portion includes the opening.

If the laser diode is used as the light source of the light projecting unit, astigmatism occurs at the converging point of the light applied towards the measuring object due to a fact that the laser diode has an astigmatic difference, but according to this aspect, the spot where the reflected light converges on the open portion becomes small and the light receiving quantity of the light received through the opening increases since the spot can be made smaller with the astigmatism of the converging point of the light applied towards the measuring object reduced.

Preferably, the specific signal frequency component is a DC component; and the filter unit removes the DC component from the light receiving signal.

The irradiation light of an intensity including the DC component merely needs to be applied at a constant intensity in units of irradiation time necessary to obtain one displacement measurement result.

According to such aspect, the control of the intensity of the applying light and the configuration of the filter unit are simplified. Preferably, the filter unit removes a minimum value of the light receiving signal obtained when the converging position of the light is changed in a predetermined range along the optical axis direction of the converging light from the light receiving signal as an offset value.

The predetermined range includes a range defined in advance as a range for changing the converging position in the displacement sensor and a range defined as a displacement measurement range by the displacement sensor for its specification.

According to this aspect, the user can easily remove an appropriate offset value from the light receiving signal.

Preferably, the filter unit removes the light receiving signal in a state the converging light is not applied onto the measuring object from the light receiving signal as an offset value.

The description of "state the converging light is not applied onto the measuring object" includes a case in which the measuring target object does not exist in the changing range of the irradiation light or in which the measuring object does not exist in the displacement measurement range of the specification of the displacement sensor, and a case in which the measuring object exists in such ranges but the converging position is not coincided on the measuring target object and the light receiving signal is a background level as the reflected light by the measuring object is substantially not received.

According to such aspect, the offset value can be easily acquired. Preferably, the light projecting unit applies light of linear polarization; the light shielding member is an object having specular reflection property; and a polarization element is arranged between the optical path separating element and the light receiving unit, the polarization element being for removing a return light, which is generated when the light of linear polarization applied from the light projecting unit is specular reflected by the light shielding member, from the optical path to the light receiving unit, and for guiding the light of a polarization direction orthogonal to a polarization direction of the return light to the light receiving unit.

The object having specular reflection property is an object having a specular reflection component, and includes an object that reflects at least some of the linearly polarized incident light in a constant polarization state by specular reflection. This includes a mirror surface metal object, a glass with vapor deposited film, and a mirror surface black object. When the light of linear polarization applied from the light projecting unit perpendicularly enters the object having specular reflection property, the reflected light has an identical polarization direction, and thus a polarization element for removing the light in the polarization direction orthogonal to the polarization direction of the applied light is simply arranged between the optical path separating element and the light receiving unit. When the irradiation light obliquely enters the object having specular reflection property, the reflected light may not necessary become the same linear polarization, but becomes a linear polarization by being passed through a phase pate in a constant polarization state, that if a phase difference of the polarization components in two directions orthogonal to each other is constant, whereby a polarization element, including a phase plate, for removing the reflected light converted to linear polarization by being passed through the phase plate is simply arranged between the optical path separating element and the light receiving unit.

According to such aspect, the light quantity of the return light reflected by the light shielding member and entered to the light receiving unit can be reduced, whereby the noise light of the background can be reduced and the measurement of a measuring object having lower reflectivity can be performed.

Preferably, the light projecting unit applies light of linear polarization; the light shielding member is an object having specular reflection property; and the optical path separating element is a polarization separation element for transmitting the light of linear polarization applied from the light projecting unit and guiding the transmitted light to the open portion, and reflecting the light of a polarization component orthogonal to the linear polarization in a different direction, or a polarization separation element for reflecting the light of linear polarization applied from the light projecting unit and guiding the reflected light to the open portion, and transmitting the light of a polarization component orthogonal to the linear polarization.

According to such aspect, the configuration can be simplified since the optical path separating element and the polarization separation element are common.

Preferably, the light projecting unit applies light of wavelength λ; and a λ/4 plate is further arranged between the open portion and the measuring object.

According to such aspect, the light specular reflected by the measuring object and entered to the light receiving unit is converted to a linear polarization orthogonal to the polarization direction of the light applied from the light projecting unit, and thus efficiently transmits through the polarization element or the polarization separation element. Therefore, when measuring the measuring object in which the specular reflection components of the surface is in great number, the specular reflected light from the measuring target object can be efficiently received and the return light generated when reflected by the light shielding member can be effectively removed.

Preferably, the sweep converging unit includes, an objective lens, and an oscillation collimator lens unit, which reciprocating oscillates along an optical axis direction, the lens converging the diverging light applied from the light projecting unit and passed through the opening to a parallel light, and guides the parallel light towards the objective lens at a predetermined time point during one round made by the lens which reciprocating oscillates; the sensor further including; a housing for accommodating an optical system including at least the oscillation collimator lens unit and the open portion, an objective lens holder for supporting the objective lens; the housing is formed with a light inlet/outlet at a position facing a lens surface on side closest to the objective lens of the oscillation collimator lens unit; and the objective lens holder is removable at the light inlet/outlet.

The optical axis direction in the description of "lens which reciprocating oscillates along an optical axis direction" means the optical axis at the position where the lens that can reciprocating oscillate exists on the optical axis.

The objective lens holder supporting the objective lenses having different focal lengths from each other may be arranged in plurals and can be changed.

According to such aspect, the objective lens is removable. The displacement measurement corresponding to various working distances (distance to measuring object) can be easily realized by changing to the objective lens having a different focal length for a common housing.

The displacement sensor according to the present invention, further includes: a setting unit for setting a minimum sensitivity level defining a minimum value of the filter processed signal to be processed; wherein the processing unit acquires information on the distance to the measuring object based on change of a signal exceeding the minimum value defined by the minimum sensitivity level of the filter processed signal.

According to this aspect, the measurement with the influence of the background light removed can be performed by appropriately setting the minimum sensitivity level if the intensity of the reflected light of the light applied itself is the highest even if another light applied onto the measuring object exists at the periphery. In other words, the level for removing as noise component can be appropriately set according to the magnitude of stray light entering from the periphery, and the light receiving quantity obtained in correspondence to the reflectivity and a surface state of the measuring object.

According to the present invention, the occurrence of displacement measurement error due to the surface roughness of the measuring object can be prevented since the light source and the light receiving opening coincide and do not shift. Furthermore, the displacement measurement can be performed while preventing lowering of sensitivity since the ratio of the component of the reflected light from the measuring object can be increased while reducing the component of the return light.

BRIEF DESCRIPTION OF THE DRAWINGS

FIGS. 3A to 3F are views describing the influence when the diameter of the spot converged on the diaphragm plate by the collective lens is changed with respect to the diameter of the pin hole in the displacement sensor of FIG. 1;

FIGS. 11A to 11D are diagrams schematically showing one example of a configuration of an optical system in a conventional displacement sensor.

DETAILED DESCRIPTION

Hereinafter, preferred embodiments of the present invention will be described with reference to the drawings. The

First Embodiment

Figure 1:
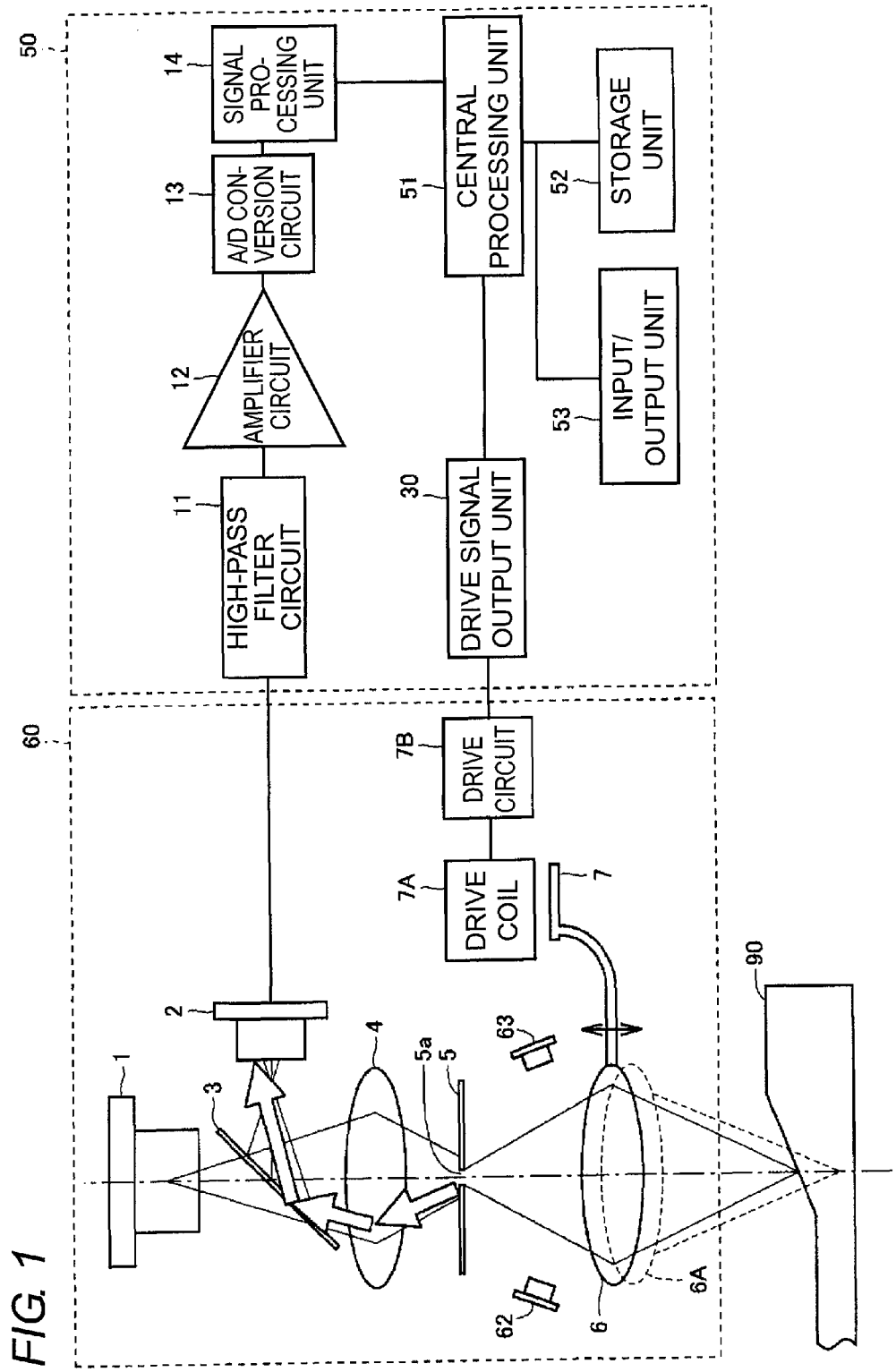
FIG. 1 is a view schematically showing the overall configuration of a first embodiment of a displacement sensor of the present invention.

FIG. 1 is a view schematically showing an overall configuration of a first embodiment of a displacement sensor of the present invention.

The displacement sensor is mainly configured by a sensor head 60 and a controller 50 for controlling the sensor head 60.

In the sensor head 60, light of a constant intensity from a laser diode 1, which is a light projecting unit, is collected towards a pin hole (aperture hole) 5a formed in a diaphragm plate 5 by a collective lens 4. A self pulsation laser may be used for the laser diode 1 to enhance the return light resistance to the laser diode 1. In this case, the intensity change of self pulsation is sufficiently high speed with respect to the response speed of a photodiode 2 and a circuit of post stage thereof, and thus it can be assumed that equivalently, the light is being applied at an intensity (constant intensity in this case) by an envelope thereof. In the present embodiment, the light projecting unit is configured by the laser diode 1 for applying light, an open portion is configured by the diaphragm plate 5, and an opening is configured by the pin hole 5a. The pin hole 5a has a circular shape. The light applied from the laser diode 1 is collected on the diaphragm plate 5 so as to include the pin hole 5a by the collective lens 4. One part of the collected light passes through the pin hole 5a, and is led to an objective lens 6. The light is then converged on the surface of a measuring object 90 through the objective lens 6. The light that passed through the pin hole 5a becomes a new diverging light. The objective lens 6 is supported by an oscillator 7. A drive coil 7A for driving the oscillator 7 is arranged at a position near the oscillator 7. The sensor head 60 includes a drive circuit 7B for carrying current to the drive coil 7A. The oscillator 7 periodically oscillates by repeating a period of flowing current to the drive coil 7A and a period of stopping the supply of current at a constant cycle. The objective lens 6 moves in a direction of approaching to or a direction of separating from the measuring object 90 according to the oscillation of the oscillator 7. A drive signal output unit 30 controls the current-carrying mode to the drive coil 7A of the drive circuit 7B. In the present embodiment, the objective lens 6 as well as the oscillator 7, the drive coil 7A, and the drive circuit 7B that move the objective lens 6 in the above manner configure a sweep converging unit. Furthermore, a laser diode 62 for applying light towards the objective lens 6 and a PSD (Position Sensitive Device) 63 for receiving the light reflected by the objective lens 6 are arranged to detect the position of the objective lens 6.

The light applied towards the measuring object 90 is reflected by the measuring object 90. The reflected light is received by the photodiode 2 through the objective lens 6, the pin hole 5a, the collective lens 4, and the half mirror 3. Here, all lights reflected by the half mirror 3 after passing through the pin hole 5a are received by the photodiode 2. In the present embodiment, an optical path separating element is configured by the half mirror 3 and a light receiving unit is configured by the photodiode 2. The light receiving signal output from the photodiode 2 is transmitted to a high-pass filter circuit 11 of the controller 50.

In the controller 50, the light receiving signal output from the photodiode 2 is removed with a direct current (DC) component by the return light in the high-pass filter circuit 11 to become a filter processed signal, and then sent to an amplifier 12. The return light refers to the light applied from the laser diode 1 to the diaphragm plate 5, the light being reflected at portions (light shielding member) other than the pin hole 5a and received by the photodiode 2 through the half mirror 3, as shown with an outlined arrow in FIG. 1.

In the present embodiment, a filter unit is configured by the high-pass filter circuit 11, and an optical path separating element is configured by the half mirror 3.

In the controller 50, the filter processed signal is amplified by the amplifier 12, and then converted to a digital signal by an A/D converter 13, appropriately processed by a signal processing unit 14, and then input to a central processing unit 51. The central processing unit 51 includes a CPU (Central Processing Unit), and executes processes and controls the operation of the entire controller 50. A set value is acquired through an input/output unit 53 and stored in a storage unit 52, or the processing result is displayed at the input/output unit or output to the outside. In the present embodiment, the central processing unit 51 configures a processing unit.

The displacement sensor of the present embodiment is a device for measuring the displacement of a surface of the measuring object 90. In FIG. 1, an optical axis from the laser diode 1 to the measuring object 90 is schematically shown with a chain line.

In the displacement sensor of the present embodiment, the objective lens 6 is fixed to the oscillator 7 by a lens holder portion 51, so that the position of the objective lens 6 is changed by a cyclic oscillation in an optical axis direction, that is, a direction indicated with a two-headed arrow on the oscillator 7 of FIG. 1 by the oscillator 7 while the measurement is being performed. In FIG. 1, one example of a state of the objective lens 6 changed by the oscillation of the oscillator 7 is shown with a broken line 6A.

Figure 2:
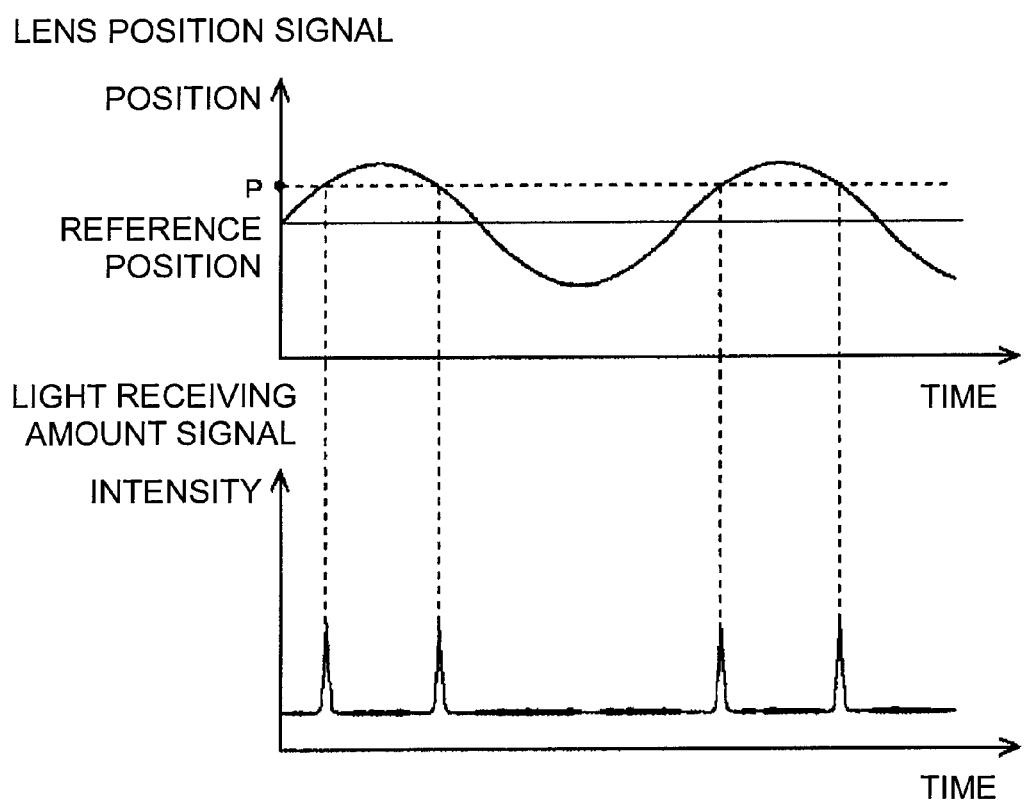
FIG. 2 is a view showing a relationship of a lens position signal and a light receiving signal in the displacement sensor of FIG. 1.

FIG. 2 shows a relationship of a signal (hereinafter referred to as "lens position signal") representing the position of the objective lens 6 and a light receiving signal obtained by the photodiode 2.

The PSD 63 receives the reflected light of the light applied from the laser diode 62 to the objective lens 6, and outputs a signal corresponding to the incident position thereof. This signal is retrieved to the central processing unit 51, and the position of the objective lens 6 is obtained based on a theory of triangulation. When this is lined in time series, the lens position signal of FIG. 2 is obtained. The lens position signal becomes a signal that changes in a sine wave manner with the position (hereinafter referred to as "reference position") when the oscillator 7 is stationary as the center.

When the surface of the measuring object 90 coincides with the converging position of the light converged by the objective lens 6, the light reflected at the measuring object 90 converges at a position of the pin hole 5a through a path opposite to the optical path (light projection path) from the pin hole 5a towards the objective lens 6. In this case, a maximum value (peak) periodically appears in the light receiving signal.

In the example of FIG. 2, the peak appears in the light receiving signal when the objective lens 6 is at position P. This means that the converging position of the light converged by the objective lens 6 coincides with the surface of the measuring object 90 when the objective lens 6 is at position P.

In the present embodiment, for example, a conversion table showing a relationship of a distance from the end of the sensor head 60 to the converging position of the light converged towards the measuring object 90 and the lens position signal is obtained in advance, and a distance to work at the converging position of the light is obtained based on the position of the objective lens 6 in a case when the peak appears in the light receiving signal using the conversion table. A displacement amount of the surface of the measuring object 90 is obtained by the displacement amount of the position of the objective lens.

When the displacement sensor of the present embodiment is used as a thickness measurement instrument, a member such as a glass is assumed as the measuring object, and the peak appears in the light receiving signal at two positions with the movement of the objective lens 6. A thickness of the member is obtained based on a difference in the positions of the objective lens 6 in a case where such peak is obtained.

In the displacement sensor of the present embodiment, the laser diode 1 is used for the light projecting unit, and a minor axis of the spot collected on the diaphragm plate 5 by the collective lens 4 is made larger than the diameter of the pin hole 5a so that the converging spot includes the pin hole 5a. Although astigmatism occurs at the converging spot on the measuring object 90 since an astigmatic difference exists in the light emitting point of the laser diode 1, the influence of astigmatism is suppressed small by the above-described configuration. This will be more specifically described.

FIGS. 3A to 3F are views describing the influence of astigmatism at the spot converged on the measuring object 90 when a ratio of the diameter of the spot converged on the diaphragm plate 5 by the collective lens 4 and the diameter of the pin hole 5a is changed.

FIG. 3E shows change in the diameter (spot diameter on work) of the spot of the light applied onto a spot diameter measurement work serving as the measuring object 90 when the diameter of the circular pin hole 5a (pin hole diameter) is changed with respect to the diameter of the spot (minor axis of spot on pin hole) converged on the diaphragm plate 5.

The light exit from the laser diode 1 has a different spread angle in a direction perpendicular to an active layer (hereinafter referred to as vertical direction) and a direction horizontal thereto (hereinafter referred to as horizontal direction), so that the spot generally has an elliptical shape when converged by the lens. Since the spread angle in the vertical direction is greater than the spread angle in the horizontal direction, the spot has a minor axis in the vertical direction when converged with the lens. A spot diameter on pin hole is the minor axis of the spot C applied from the laser diode 1 that is formed on a region including the pin hole 5a formed in the diaphragm plate 5, as shown in FIG. 3F.

In FIG. 3E, a broken line LA is the dimension of the spot on the work for a direction horizontal to the active layer of the laser diode 1, and a broken line LB is the dimension of the spot for the direction perpendicular to the active layer of the laser diode 1. The dimension of the spot in the vertical direction is measured with a position where the dimension of the spot in the horizontal direction becomes a minimum as a reference.

The difference in values of the broken line LA and the broken line LB indicates the influence of astigmatism that occurs by the astigmatic difference. As can be understood from FIG. 3E, the smaller the astigmatic difference, the smaller the ratio of the pin hole diameter with respect to the spot diameter on pin hole (smaller the value of the horizontal axis).

FIGS. 3A to 3D respectively show a spot on the work corresponding to the pin hole diameter/spot diameter on pin hole denoted with symbols A to D in FIG. 3E. In FIGS. 3A to 3D, an outer contour of the spot is emphatically shown with a frame F.

In FIGS. 3A to 3D, the spot is long in the vertical direction in FIG. 3D. This corresponds to the large difference between line LB and broken line LA at position D in FIG. 3E. In FIG. 3C, the vertical-horizontal ratio of the spot is smaller than the vertical-horizontal ratio of the spot in FIG. 3D, and in FIG. 3B, the vertical-horizontal ratio of the spot is smaller and approaches one, and in FIG. 3A, the vertical-horizontal ratio of the spot is substantially one.

When the ratio of the pin hole diameter with respect to the spot diameter on pin hole is changed as shown in FIG. 3E, the peak of the light receiving signal shown in FIG. 2 was broad and the error generated when specifying the lens position was large when the relevant ratio is greater than or equal to one. When the ratio is smaller than one, that is, when the spot diameter on pin hole is greater than the pin hole diameter, the peak of the light receiving signal as shown in FIG. 2 was sharp, and the error generated when specifying the lens position was small.

In the displacement sensor of the present embodiment, the diameter of the minor axis of the spot diameter on pin hole is greater than the pin hole diameter. Thus, the astigmatism can be reduced, and the distance to the measuring object 90 and the displacement of the measuring object 90 can be measured at satisfactory accuracy. Furthermore, the alignment of the spot applied onto the diaphragm plate 5 by the collective lens 4 and the pin hole 5a is facilitated. Although the advantages mentioned above can be achieved when the spot diameter on the diaphragm plate 5 is made greater than the pin hole diameter, the intensity of the beam applied onto the measuring object 90 through the objective lens 6 lowers if the spot diameter is too large. Thus, the size of the spot diameter on the diaphragm plate 5 is defined so that the peak can be accurately detected in view of the spread in the peak waveform as shown in FIG. 2 and the magnitude of the noise component with respect to the peak value of the waveform for the light receiving signal at the photodiode 2. The light receiving signal by the return light, shown with an outlined arrow in FIG. 1, becomes the DC component, and thus is removed by the high-pass filter circuit 11.

In the displacement sensor of the present embodiment described above, the light from the laser diode 1 is collected towards the pin hole 5a of the diaphragm plate 5 by the collective lens 4, passed through the pin hole 5a and guided to the objective lens 6. The light is reflected at the surface of the measuring object 90, and received by the photodiode 2 through the objective lens 6, the pin hole 5a, the collective lens 4, and the half mirror 3. That is, in the present embodiment, the pin hole 5a becomes the substantial light source, and becomes the diaphragm with respect to the reflected light on the measuring object 90. The light source and the diaphragm are thus configured by the same member, so that occurrence of measurement error caused by the positional shift of the light source and the diaphragm can be suppressed. The output signal of the light receiving unit (photodiode 2) that changes as shown as the light receiving signal in FIG. 2 when the sweep converging unit operates is passed through the high-pass filter to thereby obtain a filter processed signal removed with the DC component, and information on the distance to the measuring target object is acquired based on the peak of the filter processed signal. The reflected light from the measuring object thus can be extracted with the influence of the return light reduced, and high sensitivity displacement measurement can be performed.

The sweep converging unit may change the converging position of the objective lens by oscillating the objective lens in the optical axis direction as in the present embodiment, or may turn back the light with a reflection mirror that oscillates in the optical axis direction to the optical path from the light projecting unit to the measuring target object, and cause such light to enter the objective lens to thereby change the optical path length.

It may also be an optical system for enlarging a longitudinal magnification (image-forming magnification in the optical axis direction in the image-forming optical system) of the converging position on the measuring object side with respect to the light source side (light receiving unit side). Specifically, in the present embodiment, there may be adopted a configuration of having a distance from the pin hole 5a of the diaphragm plate 5 to the pin hole side main plane of the objective lens 6 shorter than a distance from the measuring object side main plane of the objective lens 6 to the converging position of the light applied towards the measuring object in a state the oscillator 7 is moved within a predetermined range, and the objective lens 6 that is moved thereby is at any position in the predetermined range. For the optical system of converging the light passed through the pin hole 5a towards the measuring object 90, the optical system configured by a plurality of lens groups including the movement lens that moves within the predetermined range may be used in place of the movable objective lens 6 as long as a distance from the pin hole 5a of the diaphragm plate 5 to the main plane on the pin hole 5a side of the optical system is made shorter than a distance of the measuring object side main plane of the optical system to the converging position of the light applied towards the measuring object in a state the movement lens is at any position within the predetermined range. In the prior art, shortening the distance on the light source side of the optical system is limited since the light source and the light receiving opening are arranged at the position of the pin hole 5a with the half mirror sandwiched with the optical system and the adjustment mechanism for aligning the light source and the light receiving opening is required, but the oscillating range of the converging position of the light applied towards the measuring object can be made greater than the oscillating range of the reciprocating oscillating lens through the use of the optical system for enlarging the axial magnification. The displacement measurement range thus can be widened.

Second Embodiment

Figure 4:
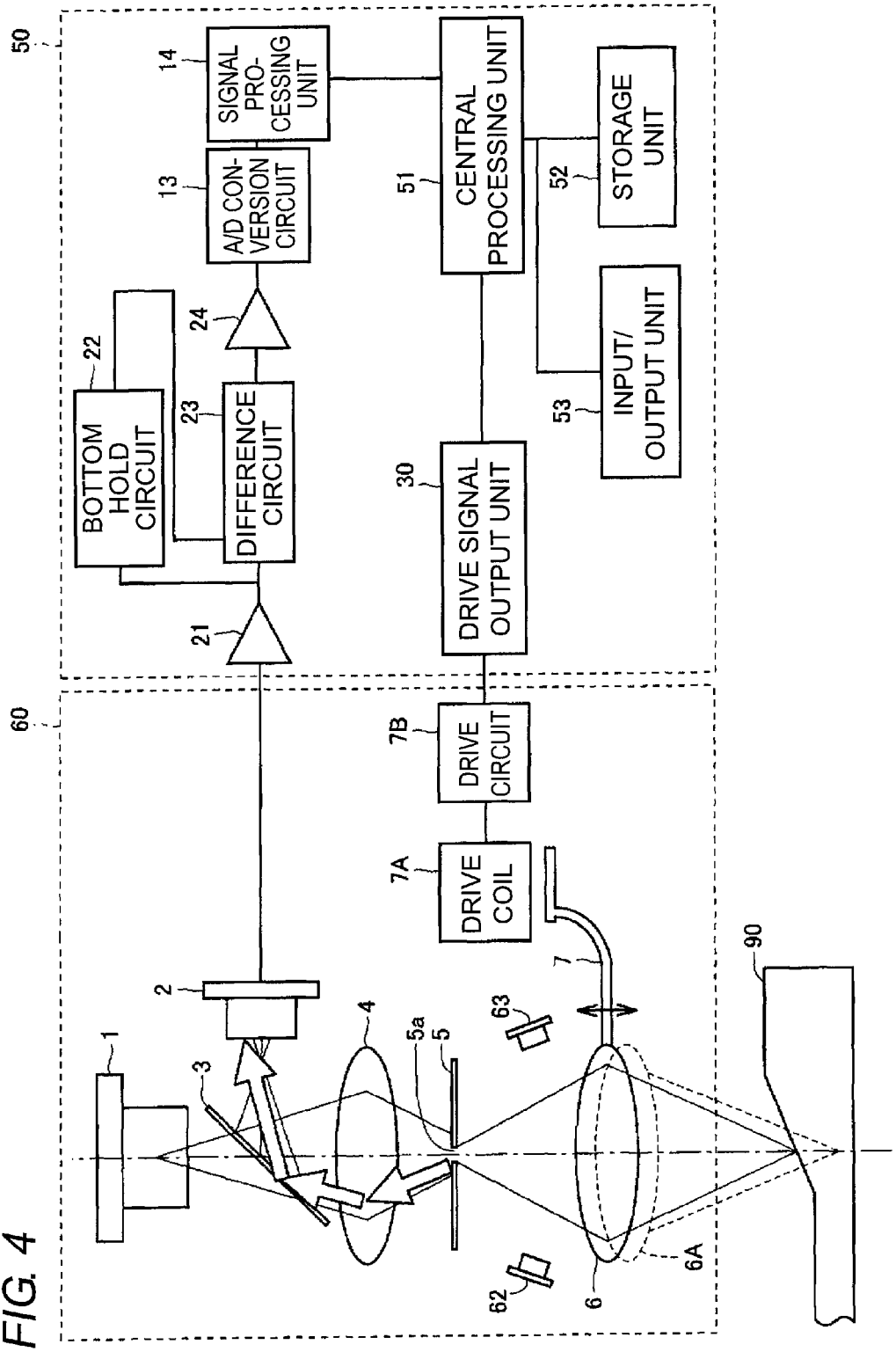
FIG. 4 is a view schematically showing an overall configuration of a second embodiment of the displacement sensor of the present invention.

A configuration of the displacement sensor according to a second embodiment of the present invention is schematically shown in FIG. 4.

The displacement sensor of the present embodiment is mainly configured by the controller 50 and the sensor head 60, similar to the first embodiment, but the configuration of the controller 50 is changed with respect to the first embodiment.

In the displacement sensor of the present embodiment, a bottom hold circuit 22 and a difference circuit 23 are arranged as filter units.

Figure 5A:
FIGS. 5A to 5D are views schematically showing signals processed in the controller of the displacement sensor of FIG. 4.

In the controller 50 of the present embodiment, the light receiving signal input from the photodiode 2 is amplified by the amplifier 21, and then input to the bottom hold circuit 22. The signal input from the photodiode 2 and amplified by the amplifier 21 is schematically shown in FIG. 5A.

Figure 5B:
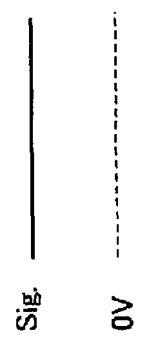

The bottom hold circuit 22 at least holds a bottom value in the light receiving signal of greater than or equal to one oscillation cycle for oscillating the objective lens. The signal shown in FIG. 5B is output from the light receiving signal shown in FIG. 5A.

The difference circuit 23 receives the signal from the bottom hold circuit 22 and the signal from the amplifier 21. The difference circuit 23 outputs a signal shown in FIG. 5C, which is a difference between the signal from the amplifier 21 and the signal from the bottom hold circuit 22.

Figure 5C:
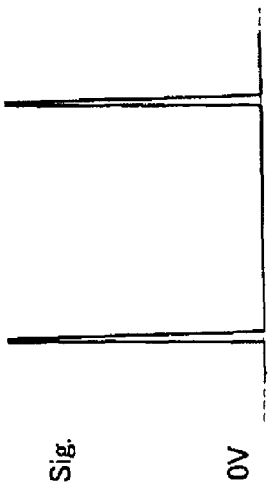
Figure 5D:
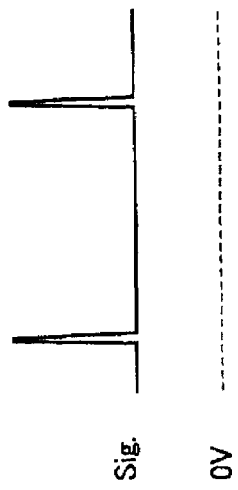

The signal shown in FIG. 5C output by the difference circuit 23 is amplified by an amplifier 24, and a signal shown in FIG. 6D is obtained.

The signal output from the amplifier 24 is converted to a digital signal by the A/D converter 13, appropriately processed by the signal processing unit 14, and then input to the central processing unit 51 to be processed similar to the first embodiment.

In the present embodiment, the bottom value shown in FIG. 5B is equivalent to a state in which the converging position of the light applied onto the measuring object 90 through the objective lens 6 does not coincide with the surface of the measuring object 90, where the reflected light received through the pin hole 5a barely exists, and the light receiving quantity is that of the return light reflected at the light shielding portion other than the pin hole 5a of the light applied onto the diaphragm plate 5, as shown with an outlined arrow (similar to FIG. 1) in FIG. 4. The values of the two peaks shown in FIG. 5A correspond to a state in which the converging position of the light applied onto the measuring object 90 through the objective lens 6 coincides with the surface of the measuring object 90, where the light receiving quantity is the sum of the light receiving quantity of the reflected light from the surface of the measuring object 90 and the light receiving quantity by the return light.

In the present embodiment, the light receiving quantity by the return light is obtained by the bottom hold circuit 22, and the reflected light component from the surface of the measuring object 90 is obtained by the difference circuit 23 by subtracting the light receiving quantity by the return light from the light receiving quantity of the photodiode 2. Therefore, in the displacement sensor of the present embodiment, the reflected light from the measuring object 90 can be extracted with the return light effectively removed, so that the reflected light quantity of the measuring object 90 can be detected without being buried in the return light even if it is very weak, and high sensitivity displacement measurement can be performed.

In the first and second embodiments, the laser diode 1 applies light at a constant intensity, and the DC component and the constant value are removed by the filter unit, but the drive current of the laser diode 1 may be modulated by a signal having a specific frequency component and filter processing for removing the specific frequency component may be performed in the filter unit. However, since the signal amount lowers when the frequency band of the peak waveform of the light receiving signal that occurs by the position change of the objective lens 6 is removed, the frequency component of the intensity signal of the light applied by the laser diode 1 is desirably different from the frequency component of the peak waveform of the light receiving signal.

Furthermore, as a variant of the present embodiment, the light receiving signal may be acquired in advance as an offset value in a state the measuring object 90 does not exist and stored in the storage unit 52, and the filter unit may be configured to subtract the offset value from the light receiving output (light receiving signal) of the photodiode 2 by the difference circuit. In this case, the central processing unit 51 may read out the offset value stored in the storage unit 52 and input the D/A converted value as the input to the difference circuit of FIG. 4 in place of the output of the bottom hold circuit 22.

Third Embodiment

Figure 6:
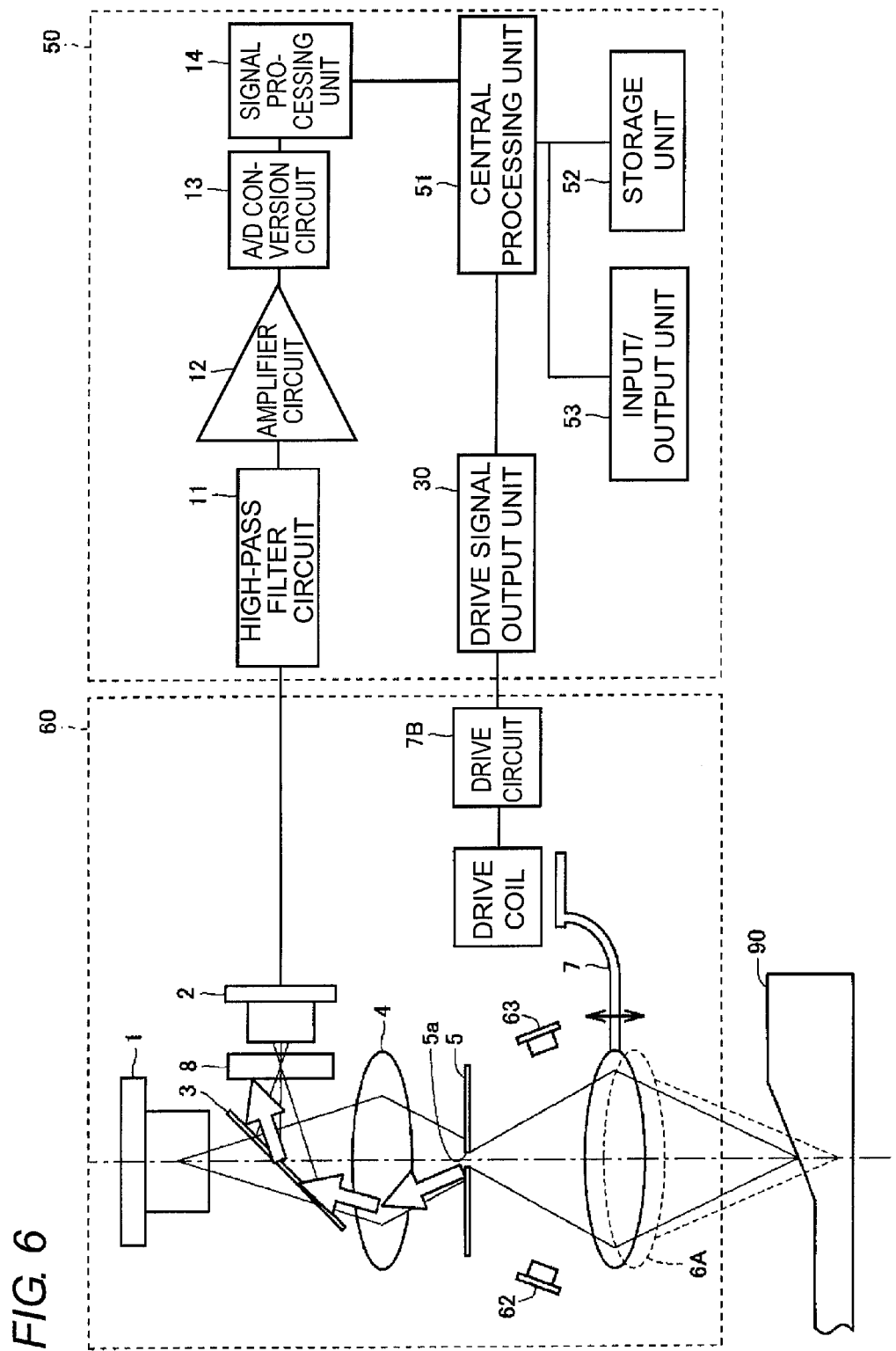
FIG. 6 is a view schematically showing an overall configuration of a third embodiment of the displacement sensor of the present invention.

A configuration of the displacement sensor according to a third embodiment of the present invention is schematically shown in FIG. 6.

The displacement sensor of the present embodiment is mainly configured by the controller 50 and the sensor head 60, similar to the first embodiment, but the configuration of the sensor head 60 is changed with respect to the first embodiment.

With reference to FIG. 6, in the displacement sensor of the present embodiment, a polarization plate 8 having a transmission axis in a direction different from a polarizing direction of the return light component shown with an outlined arrow similar to FIG. 1, that is, a direction orthogonal thereto is further arranged between the half mirror 3 and the photodiode 2. The laser diode applies a linearly polarized light, and the diaphragm plate 5 is made of a material having specular reflection property. The diffuse reflection component contained in the return light is thus reduced, and the specular reflection property is maintained at a constant polarization state. In particular, when the linearly polarized light perpendicularly enters the diaphragm plate 5, the specular reflection component of the return light also becomes a linear polarization. When obliquely entered, the reflected light may not become a linear polarization, but the polarization state of the entire reflected light does not become random and a constant polarization state is maintained. In this case, the reflected light can be converted to linear polarization using a phase plate.

The incident light quantity of the return light to the photodiode 2 can be reduced by entering to the photodiode 2 the light after the polarization component of the return light is removed by the polarization plate 8. In the light entering the photodiode 2, the proportion of the light having a polarization direction orthogonal to the return light of the return light reflected at the measuring object 90 and having a disturbed polarization direction can be set high, so that the sensitivity can be enhanced.

Fourth Embodiment

Figure 7:
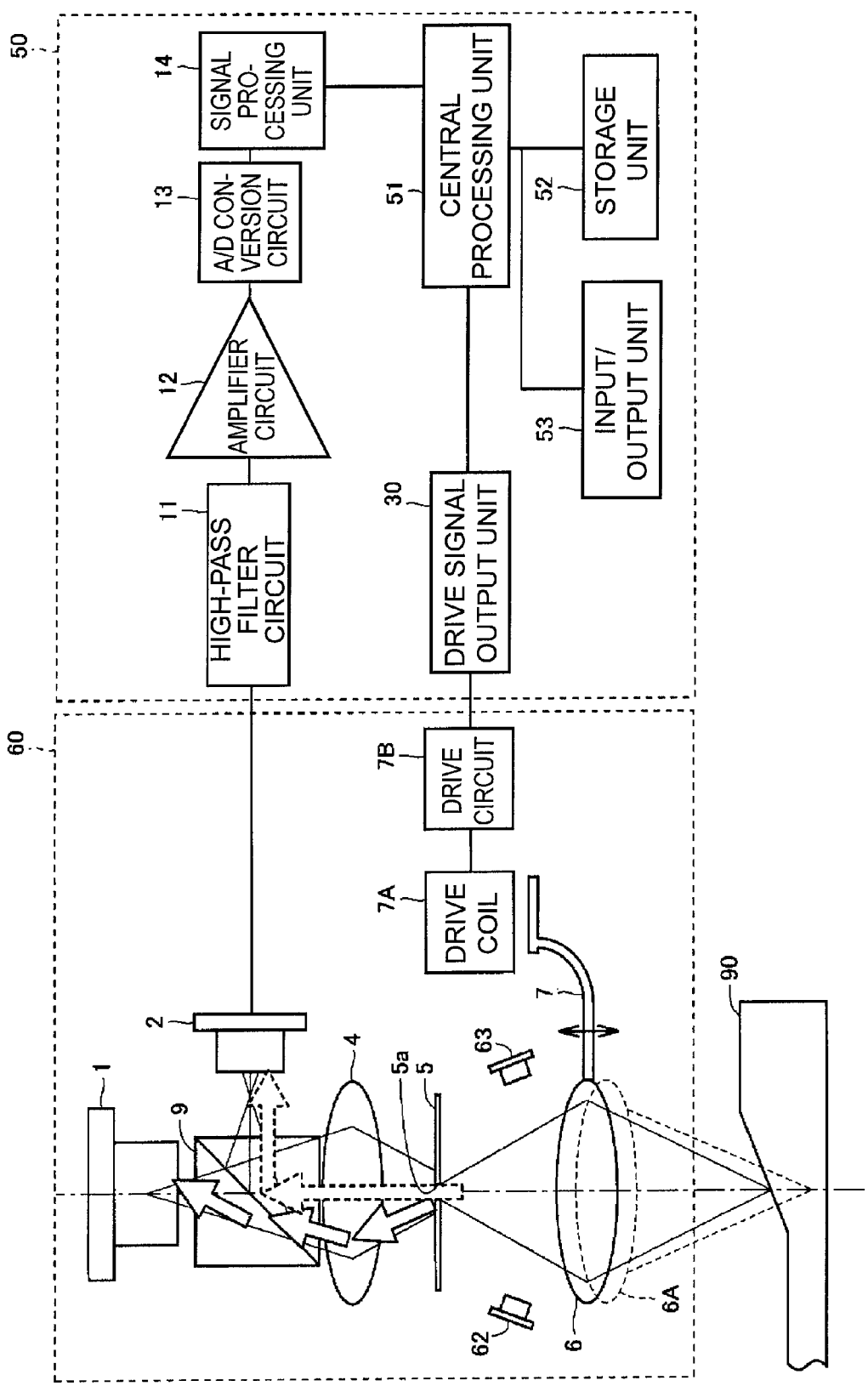
FIG. 7 is a view schematically showing an overall configuration of a fourth embodiment of the displacement sensor of the present invention.

A configuration of a displacement sensor according to a fourth embodiment of the present invention is schematically shown in FIG. 7.

The displacement sensor of the present embodiment is mainly configured by the controller 50 and the sensor head 60, similar to the first embodiment, but the configuration of the sensor head 60 is changed with respect to the first embodiment.

With reference to FIG. 7, a polarization beam splitter 9 is arranged in the displacement sensor of the present embodiment in place of the half mirror 3 in the displacement sensor of the first embodiment. A transmission axis of light transmitted to the photodiode 2 of the polarization beam splitter 9 is a direction orthogonal to the polarization direction of the return light component shown with an outlined arrow, similar to the polarization plate 8 in the third embodiment.

The incidence of the return light to the photodiode 2 can be suppressed by entering the light reflected by the polarization beam splitter 9 to the photodiode 2. In the light entering the photodiode 2, the proportion of the return light can be suppressed low, and the proportion of the light having a polarization direction orthogonal to the return light in the light reflected at the measuring object 90 and having a disturbed polarization direction can be increased.

Fifth Embodiment

Figure 8:
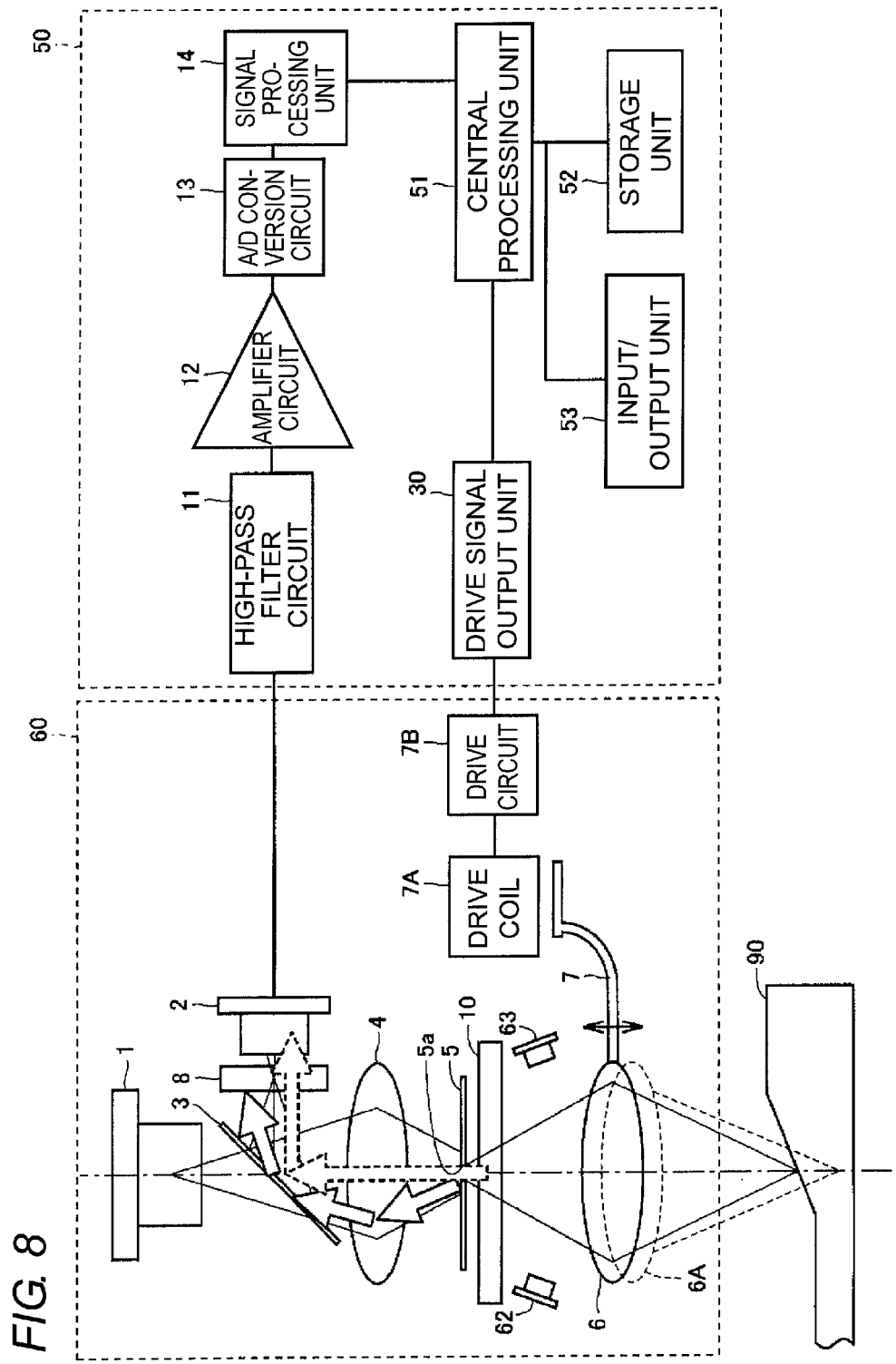
FIG. 8 is a view schematically showing an overall configuration of a fifth embodiment of the displacement sensor of the present invention.

A configuration of a displacement sensor according to a fifth embodiment of the present invention is schematically shown in FIG. 8.

Similar to the third embodiment, the displacement sensor of the present embodiment includes the polarization plate 8 between the half mirror 3 and the photodiode 2, and includes a λ/4 plate 10 for converting linear polarization to circular polarization between the pin hole 5a and the measuring object 90.

In the present embodiment, the polarization plate 8 is installed to have a transmission axis at an angle substantially orthogonal to the polarization direction of the laser light applied by the laser diode 1.

In the present embodiment, the incidence of the return light to the photodiode 2 is suppressed low, and the majority of the reflected light specular reflected at the measuring object 90 is received by entering the light passed through the polarization plate 8 to the photodiode 2.

More specifically, the light reflected at the measuring object 90 and entered the photodiode 2 through the pin hole 5a, as shown with a dotted outlined arrow, is converted to circular polarization by the λ/4 plate 10 before reaching the measuring object 90 from the pin hole 5a through the objective lens 6, and the circular polarization is converted to linear polarization orthogonal to the return light from the pin hole 5a by again passing through the λ/4 plate 10 before reaching the photodiode 2 through the objective lens 6 and the pin hole 5a after being specular reflected at the measuring object 90. That is, the reflected light shown with a dotted outlined arrow is the linear polarization orthogonal to the return light shown with a solid outlined arrow.

According to the present embodiment, in the light entering the photodiode 2, the proportion of the return light component is suppressed low, and the proportion of the reflected light received when specular reflected at the measuring object 90 is increased by having the light entering the photodiode 2 pass through the polarization plate 8 after passing through the λ/4 plate 10 twice.

Sixth Embodiment

Figure 9:
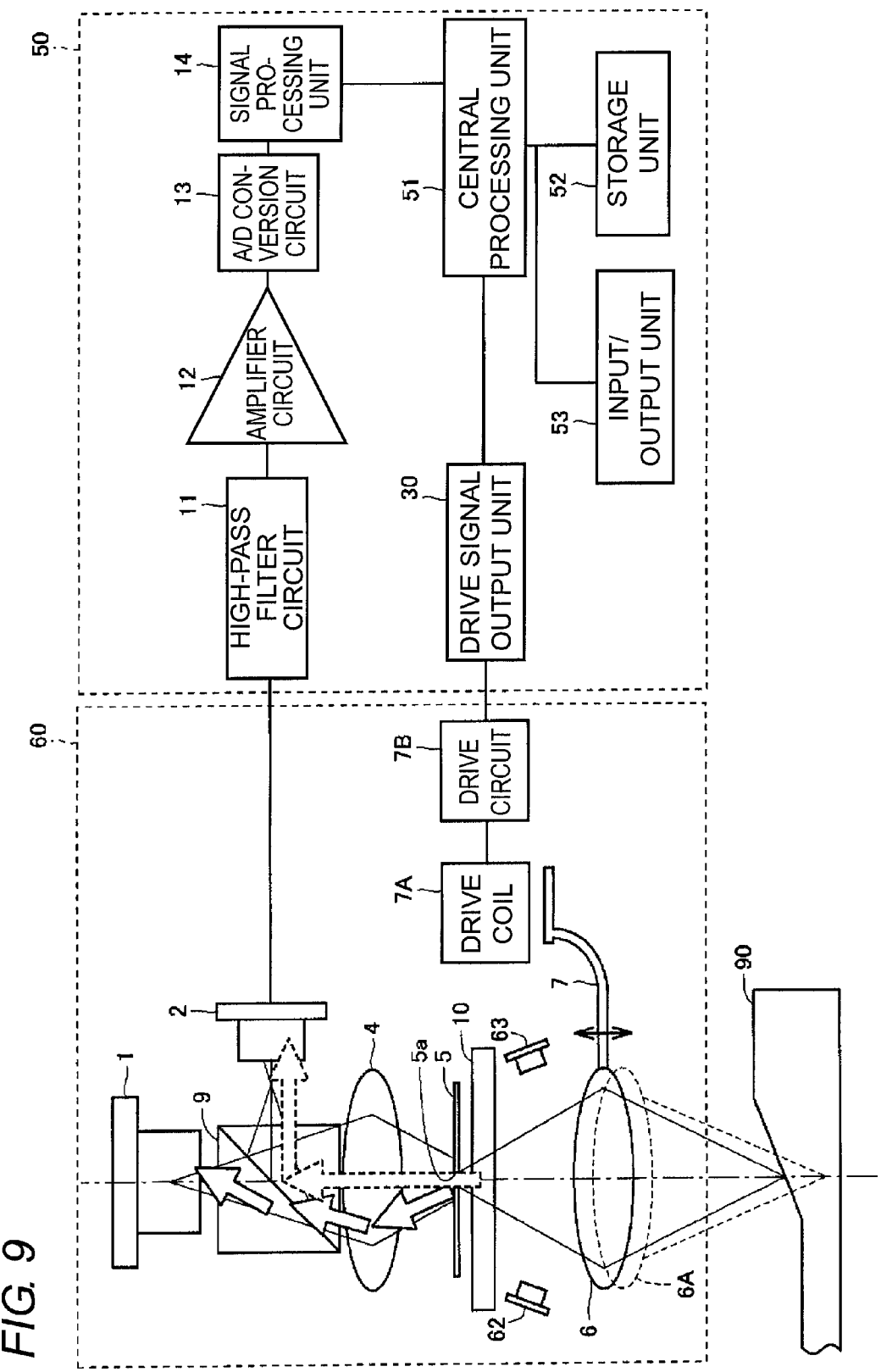
FIG. 9 is a view schematically showing an overall configuration of a sixth embodiment of the displacement sensor of the present invention.

A configuration of the displacement sensor according to a sixth embodiment of the present invention is schematically shown in FIG. 9.

The displacement sensor of the present embodiment includes the polarization beam splitter 9 in place of the half mirror 3 and the polarization plate 8 with respect to the fifth embodiment.

According to the present embodiment, in the light entering the photodiode 2, the proportion of the return light component, shown with a solid outlined arrow, can be suppressed low, and the proportion of the reflected light received when specular reflected at the measuring object 90, shown with a broken outlined arrow, can be increased by having the light entering the photodiode 2 pass through the polarization beam splitter 9 after passing through the λ/4 plate 10 twice.

Seventh Embodiment

Figure 10:
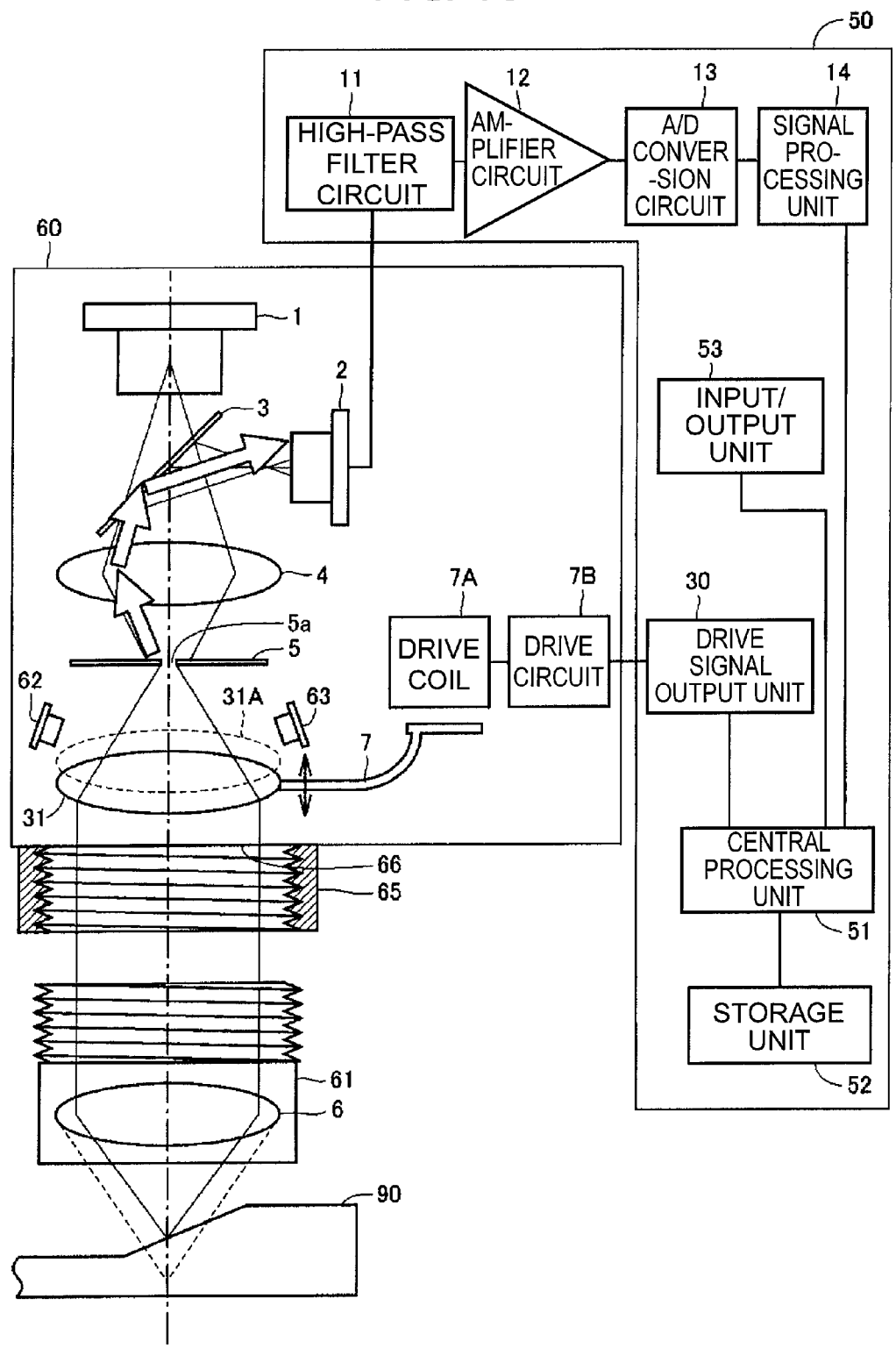
FIG. 10 is a view schematically showing an overall configuration of a seventh embodiment of the displacement sensor of the present invention.
Figure 12:
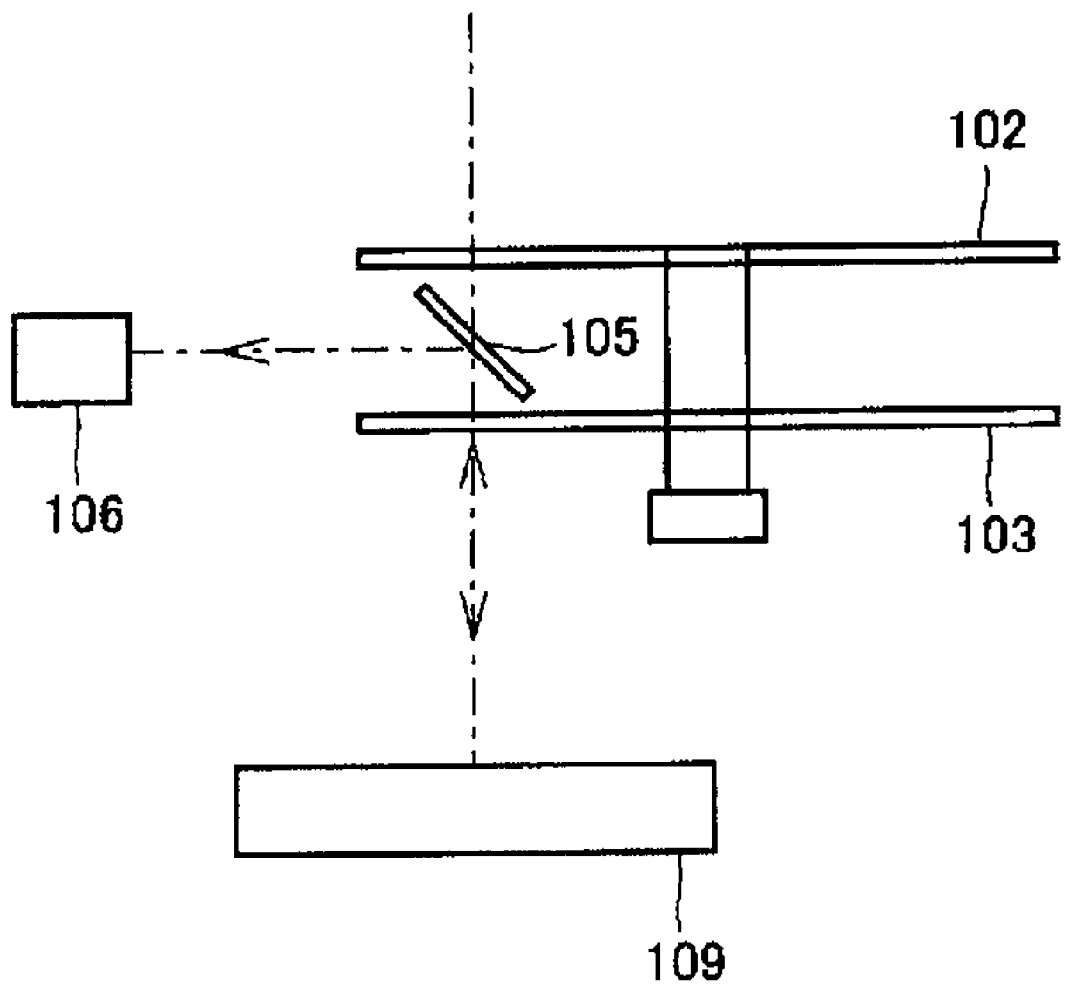
FIG. 12 is a diagram schematically showing another example of a configuration of the optical system in a conventional fluorescent confocal optical scanner.

A configuration of the displacement sensor according to a seventh embodiment of the present invention is schematically shown in FIG. 10.

The displacement sensor of the present embodiment is mainly configured by the controller 50 and the sensor head 60, similar to the first embodiment, but the configuration of the sensor head 60 is changed with respect to the first embodiment.

In the present embodiment, a lens 31 is added with respect to the first embodiment. The lens 31 is fixed to the oscillator 7 in place of the objective lens 6, and the position of the lens 31 is changed in a direction shown with a two-headed arrow in FIG. 9 along the optical axis direction. In FIG. 10, one example of a state of the lens 31 changed by the oscillator 7 is shown with a broken line 31A. The position of the objective lens 6 does not change.

In the displacement sensor of the present embodiment, the oscillator 7 for moving the lens 31, the drive coil 7A, and the drive circuit 7B configure an oscillation collimator lens unit. A housing for accommodating the optical system including the oscillation collimator lens unit, the diaphragm plate 5 in which the pin hole 5a configures the opening, the collective lens 4, the half mirror 3, the laser diode 1, and the photodiode 2 is the sensor head 60.

The sensor head 60 is formed with a light inlet/outlet 66 at a position facing a lens surface on the side closest to the objective lens of the accommodating oscillation collimator lens unit. An objective lens holder attachment portion 65 is formed at the light inlet/outlet 66, so that the objective lens holder 61 accommodating the objective lens 6 is removably attached. The objective lens holder 61 and the objective lens holder attachment portion 65 have a screw groove that fit to each other, and can be fixed with the optical axes coincided. The objective lens holder 61 and the objective lens holder attachment portion 65 may be slidably fitted in the optical axis direction with the optical axes coincided and separately fixed with a screw, without forming the screw groove. As the light exiting from the oscillation collimator lens unit and entering the objective lens becomes a substantially parallel light, a fluctuation in aberration that occurs from a fluctuation of the spacing of the lenses to be combined can be suppressed small. In other words, even if a space of the lenses slightly fluctuates, a shape of the converging spot of the light applied towards the measuring object does not greatly fluctuate.

The lens 31 is arranged between the pin hole 5a and the objective lens 6 on the optical path from the laser diode 1 to the measuring object 90. The lens 31 converts the light applied from the laser diode 1 and passed through the pin hole 5a to a parallel light towards the objective lens 6 when positioned at the center of oscillation at where the lens 31 is oscillated by the oscillator 7.

In such embodiment, the relationship between a lens position signal on the position of the lens 31 and the light receiving signal obtained by the photodiode 2, as shown in FIG. 2, is obtained when the position of the lens 31 is detected using the laser diode 62 and the PSD 63, so that the displacement of the surface position of the measuring object 90 and a thickness of the measuring object 90 can be measured.

In the present embodiment, the objective lens is removable. Furthermore, a plurality of objective lens holders 61 accommodating objective lenses having different focal lengths may be prepared and removably changed, so that a working distance from the objective lens 6 to the measuring object 90 can be easily changed.

Eighth Embodiment

A displacement sensor according to an eighth embodiment of the present invention has a hardware configuration similar to the embodiments described up to now, and differs in the process executed in the processing unit.

In the present embodiment, the central processing device 51, which is the processing unit, acquires in advance a minimum sensitivity level through the input/output unit 53 before the execution of the measurement, and stores the minimum sensitivity level in the storage unit 52. In execution of the measurement, a lens position at where the maximum light receiving quantity is obtained is obtained for the lens being moved based on the filter processed signal having a value exceeding the minimum sensitivity level with reference to the minimum sensitivity level stored in the storage unit 52 with respect to the filter processed signal input from the signal processing unit 14, and a distance to the surface of the measuring object is measured. The central processing device 51 that performs the operation of storing the minimum sensitivity level acquired through the input/output unit 53 in the storage unit 52, the input/output unit 53, and the storage unit 52 configure a setting unit.

The information on the distance to the measuring object is acquired based on the signal exceeding the input and set minimum sensitivity level of the filter processed signals. A level for removing as noise component can be appropriately set according to the magnitude of stray light entering from the periphery, and the light receiving quantity obtained in correspondence to the reflectivity and the surface state of the measuring object 90.

For instance, the stray light can be appropriately removed by appropriately adjusting to the minimum light receiving sensitivity level corresponding to the usage environment even if a plurality of openings exists and a blurred light from the peripheral openings enters as stray light to each opening.

Therefore, the noise component can be removed and a stable displacement measurement can be carried out.

[Other Variants]

The configuring elements such as the high-pass filter circuit and the bottom hold circuit arranged in the controller 50 and the sensor head 60 of each embodiment described above may be implemented as hardware by a dedicated electrical circuit or may be implemented when the central processing unit 51 executes a predetermined program, that is, as software.

The embodiments disclosed herein are illustrative in all aspects and should not be construed as being restrictive. The scope of the invention is defined by the Claims rather than by the description of the embodiments made above, and all modifications equivalent in meaning to the claims and within the scope thereof are intended to be encompassed therein. The technical idea described in each embodiment is intended to be implemented while being combined as much as possible.

What is claimed is:

1. A displacement sensor comprising:
    a light projecting unit for applying light by an intensity signal having a specific frequency component;
    an open portion including a light shielding member configuring an opening, the light shielding member shielding at least one portion of the light applied from the light projecting unit, the opening passing other portions of the light applied from the light projecting unit, and the open portion having the light passed through the opening as a new diverging light by cutting out the applied light;
    a sweep converging unit for converging and applying the diverging light passed through the opening towards a measuring object, and continuously changing a converging position of the light by a predetermined mode along an optical axis direction of the converging light, and guiding a reflected light of the light applied onto the measuring object to the open portion by advancing the reflected light in an opposite direction with respect to an optical path of the diverging light;
    an optical path separating element for separating the optical path of the reflected light passed through the opening from the optical path of the irradiation light from the light projecting unit to the opening;
    a light receiving unit for receiving the reflected light separated from the optical path of the irradiation light by the optical path separating element, and outputting a light receiving signal corresponding to an incident light quantity;

a filter unit for obtaining a filter processed signal by removing the signal of the specific frequency component from the light receiving signal; and a processing unit for acquiring information on a distance to the measuring object based on the filter processed signal; wherein the open portion changes a proportion of the reflected light passing through the opening when the converging position of the reflected light from the measuring object changes by operation of the sweep converging unit;

the specific frequency component of the signal intensity of the light applied by the light projecting unit is a frequency component different from a frequency component of the light receiving signal, which changes by the operation of the sweep converging unit, or a frequency component of one portion of the frequency component of the light receiving signal; and the processing unit acquires the information on the distance to the measuring object based on change of the filter processed signal, which occurs by the operation of the sweep converging unit.

2. The displacement sensor according to claim 1, wherein the light projecting unit applies light from a laser diode so that a spot formed on the open portion includes the opening.

3. The displacement sensor according to claim 1, wherein the specific signal frequency component is a DC component; and the filter unit removes the DC component from the light receiving signal.

4. The displacement sensor according to claim 3, wherein the filter unit removes a minimum value of the light receiving signal obtained when the converging position of the light is changed in a predetermined range along the optical axis direction of the converging light from the light receiving signal as an offset value.

5. The displacement sensor according to claim 3, wherein the filter unit removes the light receiving signal in a state the converging light is not applied onto the measuring object from the light receiving signal as an offset value.

6. The displacement sensor according to claim 1, wherein the light projecting unit applies light of linear polarization;

the light shielding member is an object having specular reflection property; and a polarization element is arranged between the optical path separating element and the light receiving unit, the polarization element being for removing a return light, which is generated when the light of linear polarization applied from the light projecting unit is specular reflected by the light shielding member, from the optical path to the light receiving unit, and for guiding the light of a polarization direction orthogonal to a polarization direction of the return light to the light receiving unit.

7. The displacement sensor according to claim 1, wherein the light projecting unit applies light of linear polarization;

the light shielding member is an object having specular reflection property; and the optical path separating element is a polarization separation element for transmitting the light of linear polarization applied from the light projecting unit and guiding the transmitted light to the open portion, and reflecting the light of a polarization component orthogonal to the linear polarization in a different direction, or a polarization separation element for reflecting the light of linear polarization applied from the light projecting unit and guiding the reflected light to the open portion, and transmitting the light of a polarization component orthogonal to the linear polarization.

8. The displacement sensor according to claim 4, wherein the light projecting unit applies light of wavelength $\lambda$; and a $\lambda/4$ plate is further arranged between the open portion and the measuring object.

9. The displacement sensor according to claim 1, wherein the sweep converging unit includes, an objective lens, and an oscillation collimator lens unit, which reciprocating oscillates along an optical axis direction, the lens converging the diverging light applied from the light projecting unit and passed through the opening to a parallel light, and guides the parallel light towards the objective lens at a predetermined time point during one round made by the lens which reciprocating oscillates;

the sensor further comprising;

a housing for accommodating an optical system including at least the oscillation collimator lens unit and the open portion, an objective lens holder for supporting the objective lens;

the housing is formed with a light inlet/outlet at a position facing a lens surface on side closest to the objective lens of the oscillation collimator lens unit; and the objective lens holder is removable at the light inlet/outlet.

10. The displacement sensor according to claim 1, further comprising:

a setting unit for setting a minimum sensitivity level defining a minimum value of the filter processed signal to be processed; wherein the processing unit acquires information on the distance to the measuring object based on change of a signal exceeding the minimum value defined by the minimum sensitivity level of the filter processed signal.

* * * * *